United States Patent [19]

Barnes

[11] Patent Number: 5,761,947

[45] Date of Patent: *Jun. 9, 1998

[54] EDGE TREATMENT TOOL

[76] Inventor: Austen Barnes, 3407 Holborn Road., RR2 Queensville, Ontario, Canada, LOG 1RO

[*] Notice: The term of this patent shall not extend beyond the expiration date of Pat. No. 5.752.402.

[21] Appl. No.: 825,592

[22] Filed: Apr. 1, 1997

Related U.S. Application Data

[63] Continuation-in-part of Ser. No. 533,507, Sep. 5, 1995.
[51] Int. Cl.⁶ .................. B21B 1/00; B21F 11/00
[52] U.S. Cl. .................. 72/203; 409/298; 72/130
[58] Field of Search ............ 72/203, 199, 130, 72/129, 710, 407; 409/298, 303, 327, 325

[56] References Cited

U.S. PATENT DOCUMENTS

| 3,691,898 | 9/1972 | Held | 409/138 |
| 4,041,751 | 8/1977 | Neilson | 72/407 |
| 5,477,721 | 12/1995 | Barnes | 72/203 |

Primary Examiner—Lowell A. Larson
Assistant Examiner—Rodney Butler

[57] ABSTRACT

An edge treatment tool defines the travel direction of a strip having edges. An edge treatment tool is supported to extend transversely to the strip travel direction and may be advanced and retracted relative to said edge to control its position relative to said edge and the supporting means causing resilient vibration of said tool in the strip travel direction.

13 Claims, 3 Drawing Sheets

EDGE TREATMENT TOOL

This application is a continuation-in-part of application Ser. No. 08/533,507 filed Sep. 5, 1995.

This invention relates to an assembly for treating strip edges.

This invention relates to novel and effective improvements in edge treatment tools, for the edge treatment of travelling strip material, edge treatment tool mounting and tool mounting adjustments.

By 'strip travel direction' herein I refer to such direction at the point of tool application.

By 'downstream' and 'upstream' respectively herein I refer to directions in and in the opposite to the direction of strip travel.

In such edge treatment the inventions to be described are adapted to cut, skive, or burnish the edges of travelling metal strip material. Such steps as cutting, skiving or burnishing involve the removal, as opposed to the re-shaping of material or to its redistribution. Moreover the removal of material provides the ability to machine accurate edge profile shapes without changing the thickness or width of the material. Edge treatment is also needed to remove burrs remaining from slitting operations and is also used to form needed edge shapes to suit various applications including acting as doctor blades for the paper industry, or for obtaining exactly abutting edges in pipe and tube mills.

Edge finishing of metallic and other materials by cutting, otherwise known as scarfing or skiving, is a well known process. Edges can be bevelled, rounded, or cut to other edge shapes using appropriate tools, or simply deburred. Tools may be plain, or each configured to take a shallow cut contributing to the forming of the desired final shape, or slotted to the profile of the required shape.

However, until recently it was not possible to use this process at material (material being strips with edges to be treated) speeds below planing speeds—about 40 feet/ minute. At and below this speed, the material tends to be torn by the tools instead of being smoothly cut.

This application is concerned with a tool mounting design which is capable of cutting smoothly at all normal strip processing speeds, typically from zero to 1,000 feet/ minute.

I have found that the edges of a strip may be treated, while travelling at below planing speeds by contacting the edge with the treatment tool while the latter is vibrating in the upstream and downstream direction, relative to the strip travel direction. It will be noted that the edge treatment tool thus vibrated is oriented to contact and treat (or cut, scarf or skive) the edge of the strip-workpiece when travelling in the upstream direction, that is at maximum speed differential to the strip edge. When the tool is travelling in the downstream direction at much smaller relative speeds to the strip, it is a non treatment side of the tool which contacts the edge.

In a facet of the invention the tool may be advanced and retracted to control the depth of cut in the workpiece edge, and in addition the tool edge angle relative to the strip travel directs or the strip plane, may be controlled.

In a facet of the invention the support means for the tool holder includes a rocker arm. In use the rocker arm typically extends generally parallel to the strip travel direction. A roller mounted at the upstream end of the rocker arm contacts the strip edge while an edge treatment tool on the trailing end contacts the strip for tool edge treatment. The connection between a support assembly and the rocker arm is damped to reduce vibration.

Also as taught in my prior U.S. Pat. No. 5,477,721 Issued 26 Dec. 1995 the support for the tool holder may be mounted so that the tool may approach the strip edge from any angle.

The support for the tool holder includes a resilient mount for the arm holding the tool which allows the deflection and vibration of the treatment tool in directions alternately upstream and downstream relative to the strip edge. Vibrating means are provided which may be coupled to the arm to cause such vibration.

Preferably the vibrating driver is coupled to the vibrateable arm so that each may move relative to the other in directions perpendicular to the main vibratory direction so that, as will be seen, adjustments such as alternating the tool cutting depth may be made when the system is running or so that adjustments in the vibratory drives, may be made without affecting the tool attitude or depth.

In a preferred aspect of the invention the vibrating driver provides a pair of opposed anvil members for contacting a frame on the support arm to transmit the vibration and the transmittal means includes resiliently compressible couplings to avoid damage to or locking of the vibration source.

In a preferred form of the invention, a means are provided allowing vibration of the tool holder in a direction along the tool edge, so that the tool is subject to vibration along the strip travel direction and also in a perpendicular direction along its edge to intermittently place a different part of the tool edge in contact with the strip edge.

In another preferred form of the invention a means is provided allowing adjustment of the tool holder in a direction along the tool edge so that the tool may be adjusted to bring a new portion of its edge, or a new notch into contact with the strip.

In drawings which illustrate a preferred embodiment of the invention:

FIG. 1A shows an alternative tool to that shown in FIG. 1.

FIG. 1B shows an alternate to an element of FIG. 1.

Figure 1:
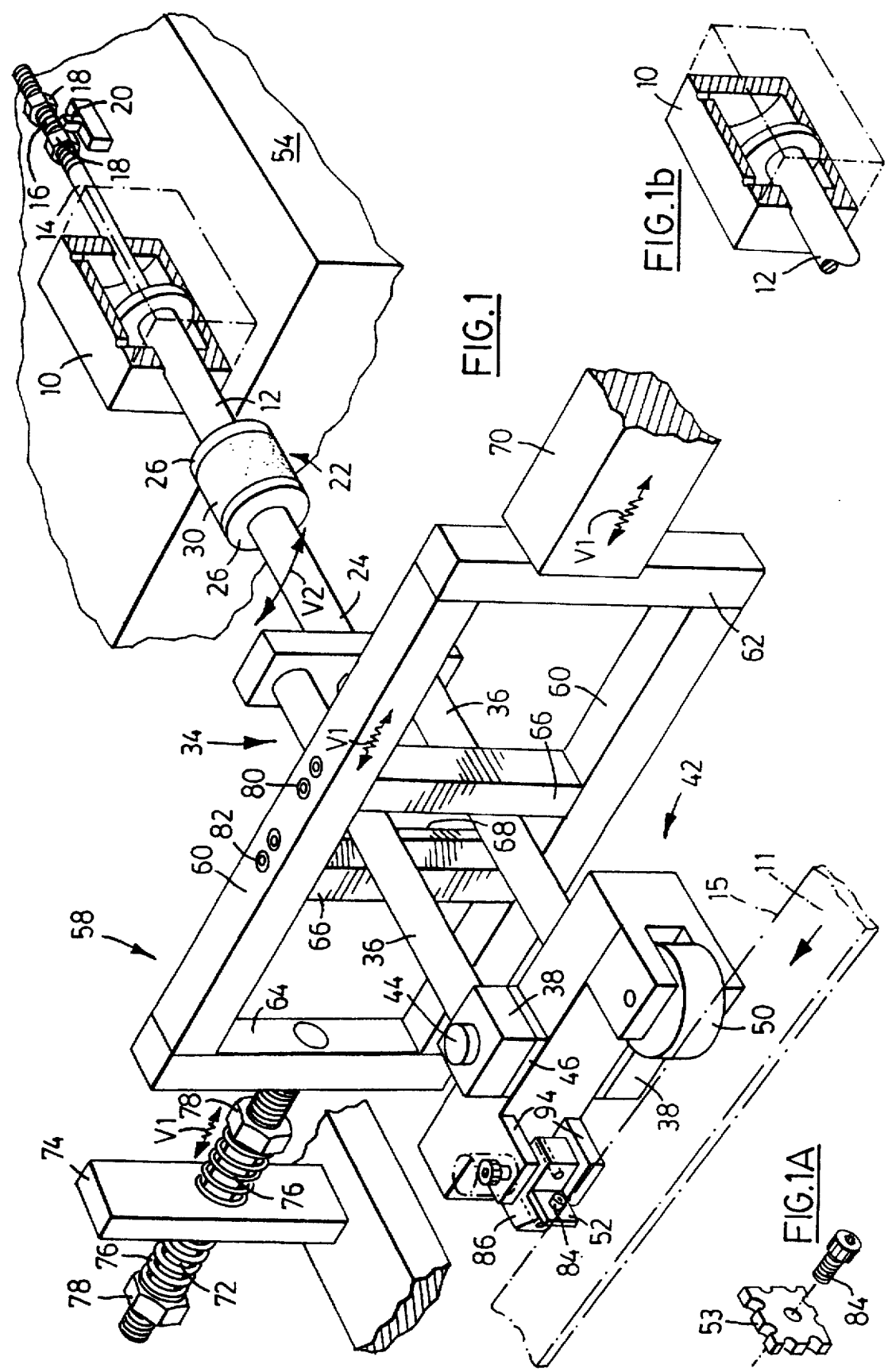
FIG. 1 is a perspective view of an assembly in accord with the invention.

In the drawings, means not shown defines a path for a moving strip 11. Laterally from the path a housing (not shown) mounts an air or hydraulic cylinder 10 having a rod 12 which is adjustable to provide the desired setting of piston rod 12. Strip 11 has an edge 15 located to be treated by a tool.

Figure 2:
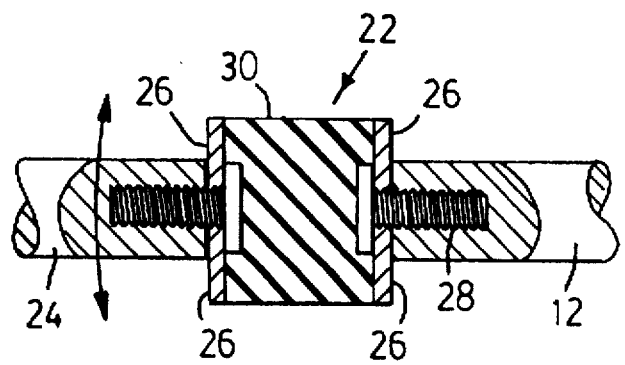
FIG. 2 shows a limited amplitude resilient joint.
Figure 3:
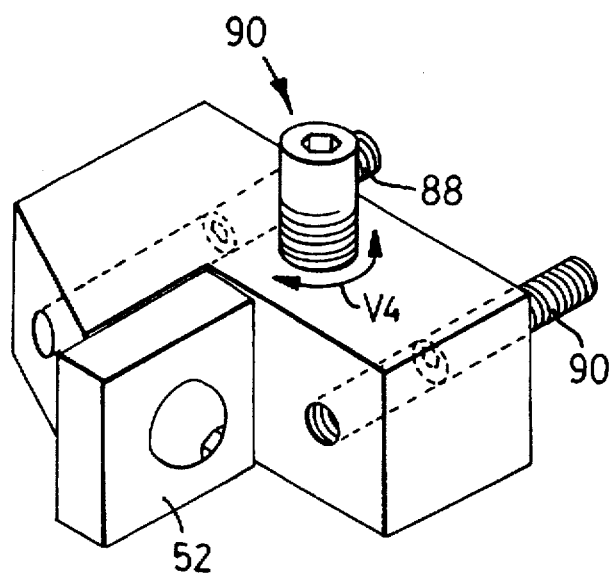
FIG. 3 shows a tool holder.

FIG. 1B shows a piston rod 12, operated by air or hydraulic lines not shown. A similar piston rod 12 is shown in FIG. 1, and here at the rear of the piston, a rod 14 projects to a threaded extent 16 with nuts 18 thereon which are adjustable relative to stop 20 which nuts 18 to determine the extension and retraction limits of the piston rods. The main piston rod 12 extending from the front of the cylinder extends to one end of a double ended vibration mount 22 shown in section in FIG. 2. A first arm formed by rod 24 and a second arm 24 each terminating in a washer 26 attached to by a bolt 28. The two rods, their washers and bolts are joined by hard rubber 30 of limited resiliency. There is thus formed a suitable limited excursion resilient universal joint. Other forms of limited excursion joint are suitable. Although the joint is universal the most important vibrations are those about an axis perpendicular to the strip travel direction and to the line from the universal mounting to the tool. For this reason the universal mounting could be replaced by a limited excursion hinge allowing vibration around such axis.

The other arm 24 extends to a yoke 34.

The joint 22 allows limited resilient universal movements. The most significant aspect if such movement is movement about axes perpendicular to the line from cylinder 10 to the strip and to the strip edge. Thus the joint could be replaced by a stiffly resilient hinge although the universal type allows somewhat more flexibility in the adjustment of the parts.

The yoke 34 has parallel rods 36 which are rigidly attached to pads. The pads 38 rotatably mount the rocker carriage 42 on fulcrum pin 44 with friction or Belleville washers 46 otherwise known as damping washers.

Such damping means reduce vibration in the rocker carriage.

Mounted on the fulcrum pins is the rocker carriage 42 which has the roller 50 on the upstream end and the tool 52, as hereinafter described on the downstream end. The tool holder will be more fully described hereinafter. Meanwhile it will be noted that with the proper setting of piston rod 12 the roller will maintain the tool, in contact with the strip at the desired cutting depth. It is noted that cylinder 10, rod (arm) 12, arm 24, yoke 34 and the carriage are fully supported by means not completely shown but represented by block 54.

A frame 58 has two longitudinal members, 60, above and below the rods. The longitudinal members are joined by frame ends 62 and 64. They are also joined by cross members 66 close, but unconnected to rods 36.

The cross members 66 with frame 58 are designed to be vibrated in a direction parallel to the strip travel direction and each cross member contacts the rod 36 to transfer such vibration to the tool holder. Accordingly each of the cross members 66 are narrowed to an anvil type face 68 located to contact the adjacent cross members 66 on vibration therestowards. The narrow face 68 reduces the friction with members 66, which allows relatively free movement of the frame 58 vertically or rods 36 axially without interference. So that the only interference is in the vibration direction V1.

Both yoke 34 and frame 58 are supported for their desired functions and vibratory movements by means not shown.

On one end of the frame 58 is the vibratory drive schematically represented at 70. Such vibratory drive may be of any suitable type to produce longitudinal vibration in frame 58. Examples of such vibratory means include: air vibrator, electromagnetic vibrator, magnetostrictive vibrator, piezoelectric vibrator, pulsing cylinder, or other mechanism such as a rotary eccentric. At the other end of the frame from the vibratory drive 70 rod 72 extending outward from the frame in the direction away from drive 70 and slides longitudinally through an aperture in the stationary beam 74. A compression spring 76 on the rod on each side of the beam, adjustable by stop nuts 78 supplies a resiliently direction of stroke.

In the broad aspects of operation, then the operation of the vibratory drive 70 causes the narrow or anvil faces to contact the yoke rods causing them to vibrate (as indicated by arrows V1) the tool holder in the direction, and its opposite, of strip travel. Thus the tool, facing the upstream to the strip travel direction will treat the strip edge on travel in the upstream direction but not on its return stroke. The return stroke is very short relative to the strip since both are travelling in the same direction.

With the vibration as indicated by arrows V1 it will be noted that the corresponding vibratory motion is indicated by arrows V2 about a universal or hinge located at 30. Although such vibration and that at V1 is technically in an arc about the universal hinging, the deviation from linear vibration at the tool holder is so small that for the purpose of the edge treatment tool, it may be considered linear.

With such vibratory arrangement a tool may be used to treat strip travelling at less than 40 ft. per minute.

It is desired that the connection between the cross members 66 and the rest of frame 58 be of stiff resiliency. Thus the cross members 66 may be mounted on pins 80 which are cushioned by hand resilient washers 82, in their mounting on longitudinal members 60. Moreover the cross members may be anvil shaped as shown with the narrow end 68 resiliently compressible by construction from hard rubber or the like. Any other resilient aspect of the relationship of the yoke to the frame, will lessen the chance of the vibratory means reaching the end of its stroke which in most vibratory drives ( other than the magnetostrictive drive), tends to cause malfunction.

It is noted that yoke 34 is freely slidable relative to frame 66 in the direction toward and away from the strip so that the depth of cut by the tool may be adjusted when the device is in operation. This degree of decoupling, in vibratory drive between yoke and frame contributes to the efficiency of the vibrating drive.

The tool 52 is bolted by attachment bolt 84 to a rocker type tool holder 86. The plain edged tool 52 is shown in FIGS. 1, 3, 4A and 4B. A notched tool 53 is shown in FIG. 1A. Tool holder is free to rock in fulcrum to enable a choice of angle of rake relative to the edge 15 of material strip 11 which travels past the tool 52 or 53 in the direction shown by the arrow.

Figure 4A:
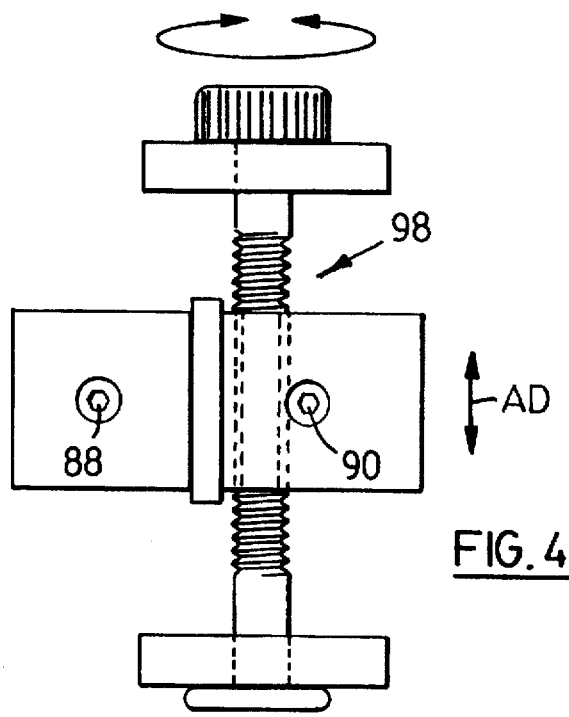
FIG. 4A show means for adjustably mounting a tool holder.
Figure 4B:
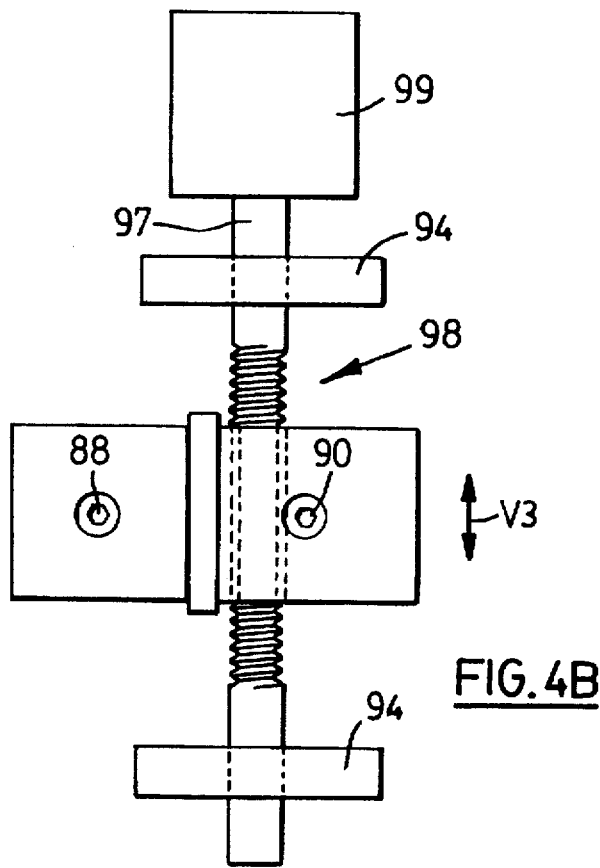
FIG. 4B shows means for vibrationally mounting a tool holder.

The desired angle of rake is locked by adjusting the set screws 88 and 90 set in tapped holes 92 at until they engage the surface of the rocker carriage 42. The changeable angle of rake is denoted by the curved arrow V4. The fulcrum or holder axis 98 may be threaded into the tool holder as shown in FIGS. 4A and 4B and may be fitted with shoulders FIG. 4 so that the fulcrum pin is held captive in flanges 94, of the rocker carriage 42. Turning of fulcrum pin where screws 88 and 90 are then slacked off results in different portions of the edge of tool 52 being engaged with the material edge 15 in the event of tool wear. Such adjustment can also line a notch in tool 53 up with a strip edge 15. The adjustment is shown on arrows AD of FIG. 4A.

Alternately the tool may be vibrated in the direction V3 nearly parallel to the tool edge perpendicular to the main vibration in direction V1 and mainly perpendicular to the edge, by making the fulcrum pin 98, threaded to the holder, slidable relative to the holder flanges 94 but connected to the plunger pin 97 of a vibratory source 99. This vibration will cause the pin to move in a saw tooth relative to the edge because of the combined mutually perpendicular vibrations. Such combined vibrations may, of course only be achieved with the tool 52, not the tool 53.

I claim:

1. Edge treatment tool comprising means defining a strip travel direction, such a strip having edges extending in said direction, supporting means for said edge treatment tool extending transversely relative to the strip travel direction, said supporting means including means for advancing and retracting said tool relative to said edge to control its position relative to said edge, said supporting means having means for causing vibration of the tool in the strip travel direction.

2. Edge treatment tool as claimed in claim 1 wherein said supporting means includes a tool holder pivotally mounted to be rotatably adjusted about an axis perpendicular to said edge.

3. Edge treatment tool as claimed in claim 1 wherein said supporting means includes a rocker arm pivotal on an axis approximately perpendicular to said strip travel direction, said rocker arm extending approximately parallel to said edge, said tool being located on one end of said rocker arm and a roller mounted on the other end of said rocker arm from said tool said rocker being arranged so that said roller contacts said edge upstream from said tool.

4. Edge treatment tool as claimed in claim 1 wherein said means for causing reciprocal vibration includes a first arm remote from said tool joining an approximately aligned second arm through a resiliently flexible joint, said joint allowing resilient deflection of said first arm relative to said second arm about at least one axis perpendicular to said strip edge, and means for causing said deflection.

5. Edge treatment tool as claimed in claim 1 wherein said tool includes a tool edge means for placing such a tool edge in contact with a strip edge in an attitude approximately perpendicular thereto, and means for vibrating said tool edge in a direction along said tool edge relative to said strip edge.

6. Edge treatment tool as claimed in claim 1 wherein said tool includes a tool edge and means for placing such a tool edge in contact with a strip edge in an attitude approximately perpendicular thereto, and means for controllably adjusting the tool edges in a direction along said tool edge relative to said strip edge.

7. Edge treatment system as claimed in claim 1 wherein means are provided for allowing vibration of the tool in its edgewise directed during vibration of the tool in the strip travel direction.

8. Edge treatment as claimed in claim 1 wherein means are provided for allowing adjustment of said tool in its edgewise direction.

9. Edge treatment tool as claimed in claim 4 wherein said second arm includes an extent extending transversely to said strip travel direction over an extent between said flexible joint and said tool, vibrating means for causing vibration of said arm including a component in the strip travel direction.

10. Edge treatment system including means defining a strip path and providing means for treating an edge of said strip, said means including an edge treatment tool located on a support extending approximately transverse to said strip edge, means for locating said edge of said treatment tool in contact with said strip edge and approximately perpendicular thereto means for alternately vibrating said tool edge in the direction of strip travel and in the opposite direction by causing corresponding vibration of said support.

11. Edge treatment system as claimed in claim 10 wherein said means allows free movement of said support relative thereto in directions perpendicular to said direction of strip travel.

12. Edge treatment tool as claimed in claim 10 wherein the coupling between said vibrator and said supports provides a resilient buffer to the limits of vibrator strokes.

13. Edge treatment tool as claimed in claim 11 wherein the coupling between said vibrator and said supports provides a resilient buffer to the limits of vibrator strokes.

* * * * *